United States Patent [19]  [11] Patent Number: 4,903,160
Elmore et al.  [45] Date of Patent: Feb. 20, 1990

[54] SUDDEN, PRESSURE RELAY SUPERVISORY APPARATUS

[75] Inventors: Walter A. Elmore; Hung J. Li, both of Coral Springs, Fla.

[73] Assignee: Westinghouse Electric Corp., Pittsburgh, Pa.

[21] Appl. No.: 704,993

[22] Filed: Feb. 25, 1985

[51] Int. Cl.⁴ .............................................. H02H 7/04
[52] U.S. Cl. ........................................ 361/37; 361/87
[58] Field of Search .................................. 361/35–38, 361/87

[56] References Cited

U.S. PATENT DOCUMENTS

| | | | |
|---|---|---|---|
| 3,323,016 | 5/1967 | Andersson | 361/36 |
| 3,984,734 | 10/1976 | Becker | 361/87 X |
| 4,204,237 | 5/1980 | Zocholl | 361/36 |
| 4,218,716 | 9/1980 | Narbus | 361/37 |
| 4,477,854 | 10/1984 | Usui et al. | 361/87 X |
| 4,502,086 | 2/1985 | Ebisaka | 361/36 X |
| 4,530,025 | 7/1985 | Usui | 361/87 |
| 4,541,029 | 9/1985 | Ohyama | 361/87 X |

OTHER PUBLICATIONS

"Current Supervision of Faul Pressure Relays on Large EHV Transformers"; Grimes, D. C. and Mozina, C. J. (Feb. 24, 1977).

Primary Examiner—A. D. Pellinen
Assistant Examiner—Anthony Wysocki
Attorney, Agent, or Firm—R. R. Studebaker

[57] ABSTRACT

Apparatus for the supervision of a sudden pressure relay (SPR) system which protects a power system network transformer having a plurality of windings associated with each phase of the power system network. This apparatus overcomes the difficulties associated with previous overcurrent supervision of the SPR system for multiple-winding transformers. The apparatus utilizes a maximum restraint signal selection network which offers a discriminating differentiation between high and low current levels in all of the transformer windings and accomplishes this in one embodiment with a single measuring unit per phase of the power system network. For each phase, when the selected maximum restraint signal exceeds a predetermined level, the supervisory unit blocks the SPR from operating the breakers which isolate the power transformer from the power system network. This blocking condition is relieved after a predetermined time period from when the selected restraint signal falls below the predetermined level. The apparatus is further capable of detecting both an internal fault condition and an inrush energization condition of the power transformer and for inhibiting the blockage of the SPR from operating the breakers during either of these detected conditions.

11 Claims, 3 Drawing Sheets

SUDDEN, PRESSURE RELAY SUPERVISORY APPARATUS

BACKGROUND OF THE INVENTION

The present invention relates to the protection of power transformers in a power system network in general, and more specifically to the protection of the transformer with a sudden pressure relay system and apparatus for supervision thereof.

Referring to FIG. 1, a power transformer 20 is provided between the line sections 22 and 24 for coupling power therebetween in a power system network. The schematic illustration of FIG. 1 shows only one phase of the power system network, but it is understood that the network may include three phases, for example, in which case there would be an additional line section for each phase. The simple example of FIG. 1 depicts the transformer 20 with only two windings, 26 and 28.

A conventional differential relay unit 30 is provided for protecting the power transformer 20 from internal faults. Currents depicted by the arrows 32 and 34 entering and leaving the transformer 20 through line sections 22 and 24, respectively, may be measured by current transformers 36 and 38 disposed correspondingly on either side of the transformer 20 using the line sections 22 and 24, respectively, as the primary windings thereof. The current transformers 36 and 38 establish a differential zone 40. Also disposed at either end of the transformer 20 between its corresponding current transformer 36 or 38 and the transformer 20 is a conventional breaker unit 42 or 44, accordingly. In general, the differential relay unit 30 monitors the currents 32 and 34 of the power transformer 20 via current transformers 36 and 38 and from this information determines if an internal fault exists within the power transformer 20. In the event that an internal fault is detected, the unit 30 energizes a relay coil 46, denoted as DR, which ultimately causes the breakers 42 and 44 to isolate the power transformer 20 from the power system network. Conventional differential relay units generally also include an implementation which distinguishes external power line faults outside of the differential zone 40 from internal faults of the transformer 20 and cause the relay unit 30 to be inoperative with regard to a detected external fault.

Moreover, in connecting the power transformer 20 to the power system network, the general procedure is to close the breakers 42 and 44 sequentially. When the transformer is excited by the current through the first closed breaker, the initial surge of excitation current upon closure of the first breaker may be very high, on the order of 10 times the rated current of the power transformer 20. Under these conditions, there is a differential current established about the transformer 20 as measured by the current transformers 38 and 36. For example, suppose breaker 44 is closed first, then the current transformer 38 measures the inrush current associated therewith and the current transformer 36 measures zero current because the breaker 42 has not yet been closed. Present differential relaying units 30 are designed to distinguish between inrush and internal fault currents to permit the relay unit 30 to disregard overcurrent conditions which result from excitation inrush.

However, to accomplish this capability of distinguishing between excitation inrush and internal fault overcurrent conditions, the relay overcurrent detection of the differential relay was desensitized to the point where internal turn-to-turn winding fault conditions of the power transformers were undetectable. Consequently, a single turn short in the winding of a power transformer could not be distinguished by a conventional differential relay. Thus, the conventional differential relay units could not be relied upon to fully protect the power transformers within their power system networks.

To complement the differential relay in the protection of the power transformers, a sudden pressure relay (SPR) 50 was introduced into the protection scheme. The operation of the SPR required that the power transformer 20 be enclosed in a sealed tank, denoted in FIG. 1 by the box 48. The SPR 50 is disposed through the sealed tank and is responsive to the rate of change of gas pressure inside the sealed transformer tank 4. Accordingly, the SPR 50 is sensitive enough to respond to a pressure change inside the sealed tank 48 which is caused by turn-to-turn faults. Unfortunately, the SPR 50 will also respond to severe external faults. Upon detection of a faulty condition, the SPR 50 may energize a relay coil SPR 52.

The contacts of the relay coils DR and SPR may be logically combined as shown in the schematic of FIG. 2 to energize a lockout relay coil, denoted as LR. The contacts SPR and DR are connected in parallel between an upper potential denoted as Vu and a normally closed contact LR of the lockout relay coil. The lockout relay coil is coupled between a lower voltage potential $V_L$ and the other side of the normally closed contact LR. Thus, when either of the relay coils DR or SPR is energized, current is allowed to energize the relay coil LR between the upper and lower voltage potentials Vu and $V_L$, respectively. Once energized, the lockout relay operates to open the breakers 42 and 44 and isolate the transformer 20 from the power system network. Thereafter, the lockout delay coil may only be reset manually by an operator, for example.

One drawback of the aforementioned protective arrangement is that severe external fault conditions may cause false operation of the SPR which results in a degradation of the security of the protection system. More specifically, severe external faults cause heavy bulk currents to flow through the transformer 20 which introduces a severe mechanical vibration from the transformer windings to render a sufficient rate of change of the gas pressure in the sealed tank to operate the SPR 50. Because the SPR 50 cannot distinguish between the rate of change of pressure caused by a through or external fault and a legitimate internal fault, the protective scheme utilizing the SPR is vulnerable to false operations. Since the SPR provides such a necessary and sensitive fault detection function for a utility's most critical and expensive transformers, a solution of this problem is of paramount importance.

One solution to the aforementioned problem is described in the paper "Current Supervision of Fault Pressure Relays on Large EHV Transformers", authored by Grimes, D. E. and Mozina, C. J. from Cleveland Electric Illuminating Company which was presented at the Pennsylvania Electric Association Relay Committee Meeting in Reading, PA, Feb. 24, 1977. The authors' proposal was to make the SPR 50 inoperative for high magnitude faults above the thresholds of operation of the transformer differential relay 30. A simple embodiment of this concept is shown in the schematic illustration of FIG. 3. Grimes and Mozina propose to use an overcurrent relay 60 to supervise the SPR operation. The purpose of the overcurrent relay 60 is to detect an external fault condition and render the SPR 50 inoperative. To achieve this, the overcurrent relay 60, denoted as OCR, may be disposed in series with the current transformer 38, for example. The overcurrent relay 60 may be set higher than the maximum or rated load current of the transformer, thus if a very heavy current is created from either an external or internal fault, the OCR 60 will operate to open a normally closed contact. The overcurrent relay contact OC is added in series with the SPR contact in the relay logic as shown in the relay logic schematic diagram of FIG. 4. In this arrangement, when the OCR 60 is activated, the contact OC opens, thus blocking the circuit path of the SPR contact from energizing the lockout relay LR. One very important requirement for this overcurrent supervision scheme is for the OCR 60 to detect and react to the heavy current condition before the SPR 50 reacts and closes the contact SPR. In addition, the OCR 60 must remain energized for a period of time beyond the time when the heavy current condition is relieved to permit the SPR to stabilize and open the SPR contact.

The aforementioned described solution appears to be adequate for a two winding transformer such as has been described in connection with the embodiment of FIG. 3, but a dilemma is created for transformers of three or more windings, i.e. multiple-winding transformers, in deciding how many OCR's to include and where to dispose the OCR's in the protective circuitry. For example, for a three winding transformer, at least two OCR's will be needed to cover all possibilities of external through-fault conditions. In general, for a transformer having N windings, there will be needed N−1 OCR devices for each phase of the power system network which become quite cumbersome and expensive to implement.

Another drawback of the overcurrent supervision scheme just described is that the OCR does not discriminate between severe overcurrent internal and external fault conditions. This results in blocking the operation of the SPR even under the desirable operating conditions of an internal fault. Consequently, the redundancy feature of paralleling the SPR and DR contacts (see FIG. 4) is eliminated.

The present invention of a supervisory unit for the SPR system proposes to eliminate the need of the OCR's for SPR supervision and overcome the aforementioned drawbacks without loss of protection security for the power transformer.

SUMMARY OF THE INVENTION

In accordance with the present invention, apparatus is provided for the supervision of a sudden pressure relay (SPR) system which protects a power transformer of a power system network of at least one phase. The power transformer includes a plurality of windings associated with the power system phase, is disposed in a sealed enclosure and is susceptible to internal and external faults. The SPR system operates to detect a fault condition of the power transformer and to generate a fault signal indicative thereof. Breakers for each of the transformer windings are operated conditionally in response to the SPR generated fault signal to isolate the transformer windings from the power system network.

The SPR supervisory apparatus generates restraint signals corresponding to generated current representative signals associated with each of the transformer windings and selects the generated restraint signal having the greatest amplitude. The supervisory apparatus blocks the SPR generated fault signal from operating the breakers when the selected restraint signal exceeds a predetermined level and relieves the blocking condition when the selected restraint signal is below the predetermined level. The relief from the blocking condition is delayed for a predetermined time period starting from when the selected restraint signal is rendered below the predetermined level.

Further, the SPR supervisory apparatus detects an internal fault condition of the power transformer and inhibits the blockage of the SPR generated fault signal from operating the breakers during the detected internal condition. Still further, the supervisory apparatus also detects a inrush energization condition of the power transformer and inhibits the blockage of the SPR generated fault signal from operating the breakers during the detected inrush condition.

DESCRIPTION OF THE PREFERRED EMBODIMENT

As described in the Background section hereabove, for multiple-winding transformers, the application of an overcurrent supervision protection scheme is complicated by the possibility of a "through-fault" occurring in any combination of current carrying input and output paths of the transformer. To cover all of these contingencies, more than one set of input and output current paths must be supervised for the multiple-winding transformer, increasing the cost and complication of the supervision process. The present inventive concept proposes to overcome the difficulties associated with the overcurrent supervision of the SPR for multiple-winding transformers. The utilization of a maximum restraint signal network offers a discriminating differentiation between high and low current levels in all of the transformer windings which may be accomplished in a single measuring unit per phase. The preferred embodiment thus will provide a straightforward, secure and far less costly means of supervising the SPR of a power transformer. Such an embodiment is depicted in the block diagram schematic illustration of FIG. 5 and the corresponding relay logic schematic of FIG. 6.

Figure 1:
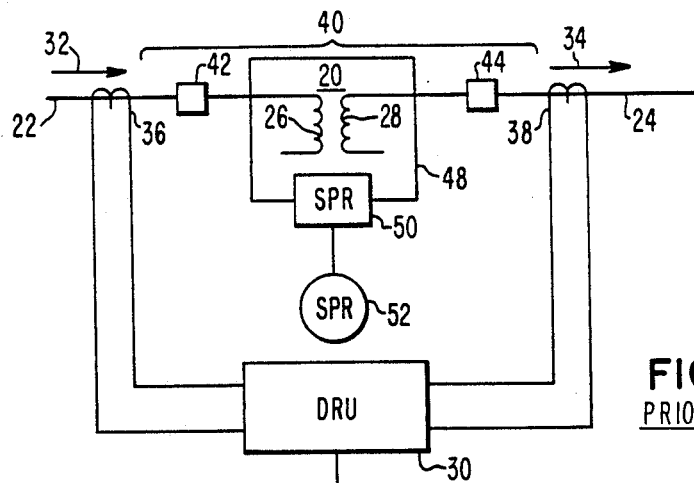
FIG. 1 is a block diagram schematic illustration of a power transformer in a power system network being protected by a differential relay unit and a sudden pressure relay.
Figure 2:
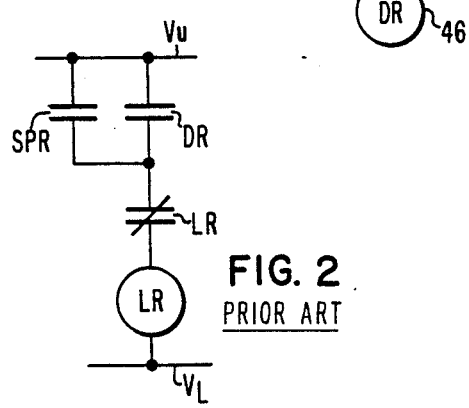
FIG. 2 is a relay contact logic schematic depicting the logical cooperation between the differential relay unit and sudden pressure relay in protecting the power transformer embodiment depicted in FIG. 1.
Figure 4:
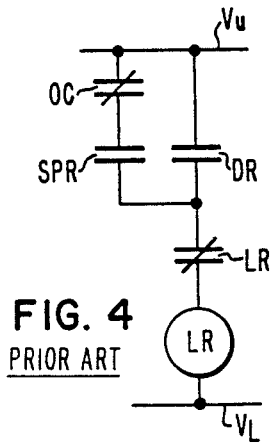
FIG. 4 is a relay contact logic schematic depicting the logic supervision of the overcurrent relay on the sudden pressure relay operation.
Figure 3:
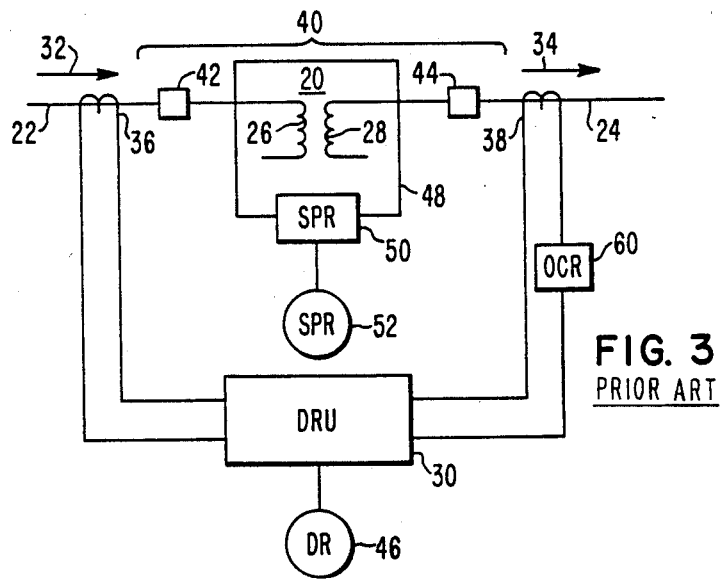
FIG. 3 is another schematic illustration of a power transformer network similar to the embodiment of FIG. 1 but including an overcurrent relay to render the sudden pressure relay inoperative for high-magnitude transformer faults above the thresholds of operation of the differential relay unit.
Figure 5:
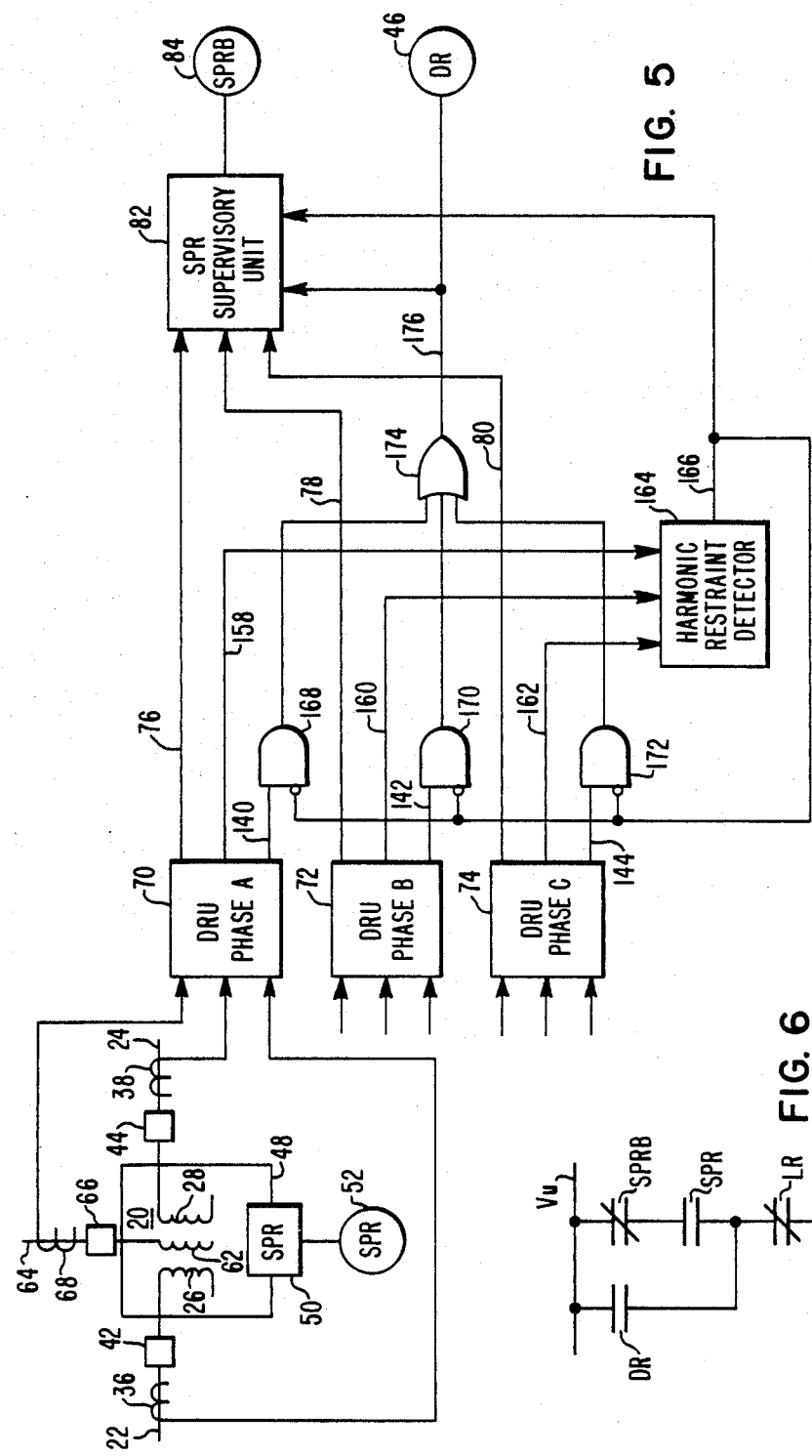
FIG. 5 is a block diagram schematic of a sudden pressure relay supervisory system suitable for embodying the principles of the present invention.
Figure 6:
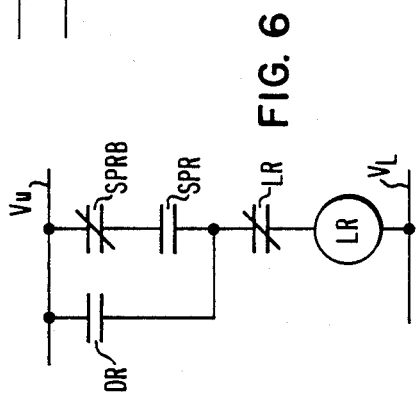
FIG. 6 is a relay contact logic schematic depicting the logic cooperation of the supervisory system depicted in FIG. 5.

Referring to FIG. 5, the power transformer 20 is depicted with a third winding 62 for the purposes of describing a multiple-winding transformer in the preferred embodiment. The winding 62 is coupled to the power system network using the line section 64 through a conventional breaker unit 66. A third current transformer 68 is provided for measuring the current associated with the third winding 62. The three winding transformer depicted in FIG. 5 is representative of a multiple-winding transformer in a power system network. The illustration of FIG. 5 only depicts one phase, denoted as the A phase, of the power system network, but it is understood that three phases conventionally exist. Accordingly, the other two phases, denoted as B and C, have similar transformer circuit arrangements as that depicted in the phase A embodiment of FIG. 5.

Signals generated by the current transformers 36, 38 and 68 which are representative of the currents in the windings 26, 28 and 62, respectively, may be provided to a corresponding differential protective relay unit, denoted as DRU. For phase A the current representative signals may be provided to the unit 70, for phase B the unit 72 and for phase C the unit 74. Each DRU 70, 72 and 74 is operative to generate restraint signals correspondingly from the generated current representative signals and for selecting the restraint signal having the greatest amplitude. The selected restraint signals may be provided correspondingly over signal lines 76, 78 and 80 to an SPR supervisory unit 82 from the DRU's 70, 72 and 74, respectively. The details of the internal operation of a typical DRU will be described more specifically hereinbelow. The SPR supervisory unit 82 is governed by the selected restraint signals 76, 78 and 80 to energize an SPR blocking relay coil 84, denoted as SPRB. A normally closed relay contact SPRB of the coil 84 may be connected in series with the SPR contact as shown in the relay logic schematic of FIG. 6 for blocking the operation of the LR relay coil in response to SPR contact closure under pre-specified conditions.

Figure 7:
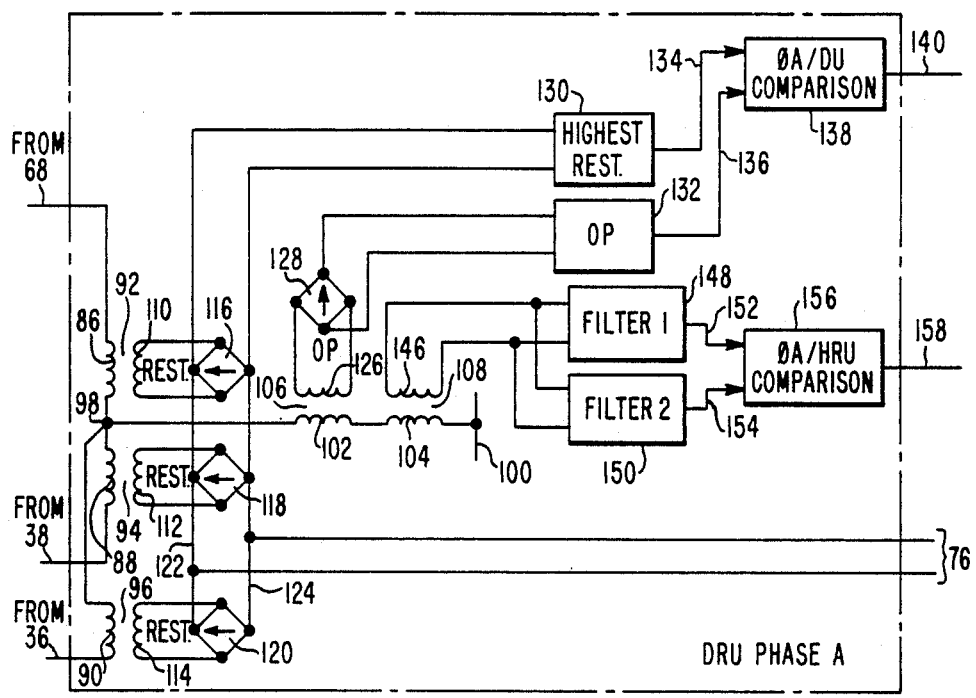
FIG. 7 is a block diagram schematic of a differential relay unit suitable for use in the embodiment of FIG. 5.

A typical differential relay unit for three-winding transformer protection is depicted in the block diagram schematic of FIG. 7. Referring to FIG. 7, the current representative signals associated with current transformers 68, 38 and 36 are each coupled to one winding 86, 88 and 90 of their corresponding signal transformers 92, 94 and 96, respectively. The windings 86, 88 and 90 are star coupled to a common point 98 which is coupled to a common potential 100 through the windings 102 and 104 of auxiliary signal transformers 106 and 108, respectively. The current representative signals of 68, 38 and 36 effect a first potential representative of the corresponding restraint signal across the windings 86, 88 and 90. These first potentials induce electromagnetically a second potential across the other windings 110, 112 and 114 of the transformers 92, 94 and 96, respectively. The second potentials of 110, 112 and 114 are respectively proportional to their corresponding first potentials of 86, 88 and 90.

Diode bridge networks 116, 118 and 120 are coupled to the windings 110, 112 and 114, respectively, to effect a full-wave rectified second potential signal across the output terminals thereof in each case. Accordingly, the rectified signals developed across the bridges 116, 118 and 120 are always proportional to the currents measured by the current transformers 68, 38 and 36, respectively. Circuit paths 122 and 124 couple like terminal outputs of the diode bridges 116, 118 and 120 in parallel wherein the potential across the circuit paths 122 and 124 is representative of a selected restraint signal which may be provided over signal lines 76 to the SPR supervisory unit 82, for example. Moreover, since the bridges 116, 118 and 120 are connected in parallel, the selected restraint signal 76 is always the highest of the signals developed by 116, 118 and 120.

Operationally, if an external fault occurs on line section 64, the current transformer 68 detects the total external fault current through the power transformer 20. This current consists of two parts; one supplied from source 24, and the other supplied from source 22. Since the fault current on line section 64 is the sum of those currents 24 and 22, the current through current transformer 68 is the highest one among 68, 38 and 36, i.e., the highest restraint signal would be produced by bridge 116 and developed on signal line 76 indicating this external fault. Similarly, if an external fault occurs on line section 24, the total external fault current through the power transformer will be detected by current transformer 38. Consequently, the bridge 118 will produce the highest restraint signal which will also be developed across the signal line 76. It is therefore evident that the signal 76 is always proportional to the total current through the power transformer resulting from an external fault.

The potential developed across the winding 102 of the signal transformer 106 induces a potential across another winding 126 thereof wherein the induced potential across winding 126 is representative of the operating signal measurement of the differential relay unit. Another diode bridge network 128 is coupled to the winding 126 to full-wave rectify the operating signal potential developed thereacross. The selected restraint signal developed across conductor paths 122 and 124 and the operating potential developed from the diode bridge network 128 may be provided to conventional conditioning circuits 130 and 132, respectively. The selected restraint signal and operating signal may be conducted over signal lines 134 and 136, respectively, to a conventional comparison unit 138 which determines whether or not an internal fault condition exists within the differential zones established by the measurement current transformers 68, 38 and 36. The comparison unit 138 generates a signal 140 in one state to indicate an internal fault condition and in a second state to indicate no internal fault condition. The differential units for phases B and C similarly generate internal fault indicative signals over signal lines 142 and 144, respectively (FIG. 5).

The potential developed across the winding 104 of the auxiliary signal transformer 108 (FIG. 7) may be coupled electromagnetically to another winding 146 which may be coupled to two conventional filter networks 148 and 150 arranged in parallel. For the present embodiment, the filter network 148 may be a bandpass filter passing a signal 152 which is representative substantially of the second harmonic content of the operating signal induced across the winding 146. Conversely, the filter network 150 may be a band reject filter for rejecting substantially the second harmonic content of the same operating signal to pass a signal 154 representative of the signal content of the remaining frequency spectrum thereof. The signals 152 and 154 may be compared in another conventional comparison unit 156, normally referred to as a harmonic restraint comparator, which determines whether or not an inrush excitation condition exists. The comparator 156 generates a signal 158 to a first state if the inrush condition is determined to exist and in a second state if no such condition exists. In a similar manner, the other differential relay units 72 and 74 likewise generate inrush condition signalling 160 and 162, respectively.

Moreover, for the three-phase embodiment such as depicted in the diagram of FIG. 5, a harmonic restraint detector 164 is included for detecting if any one of the signals 158, 160 and 162 indicate an inrush condition. When an inrush condition is determined, the detector 164 generates its output signal 166 in a first state indicative thereof. The signal 166 is provided to an inverting input of each of three AND gates 168, 170 and 172. The signals 140, 142 and 144 are respectively coupled to the other input of the AND gates 168, 170 and 172 such that when the signal 166 is in the first state which is indicative of an inrush condition, it blocks the internal fault condition signals 140, 142 and 144 from passing to downstream circuitry. The signal 166 is also coupled to the supervisory unit 82, the details of which will be described more specifically hereinbelow.

Still further, when the signal 166 is generated in a second state indicative of a non-inrush condition, the AND gates 168, 170 and 172 are enabled to pass the existing state of the signals 140, 142 and 144 downstream to an OR gate 174 which effects its output signal 176 to a first state if any one of its input signals is at a first state. The signal 176 being in a first state is indicative of an internal fault condition of the transformer 20 in any one of the phases. The signal 176 may be used to energize the DR relay 46 and be also provided to the supervisory unit 82 for use therein.

Figure 8:
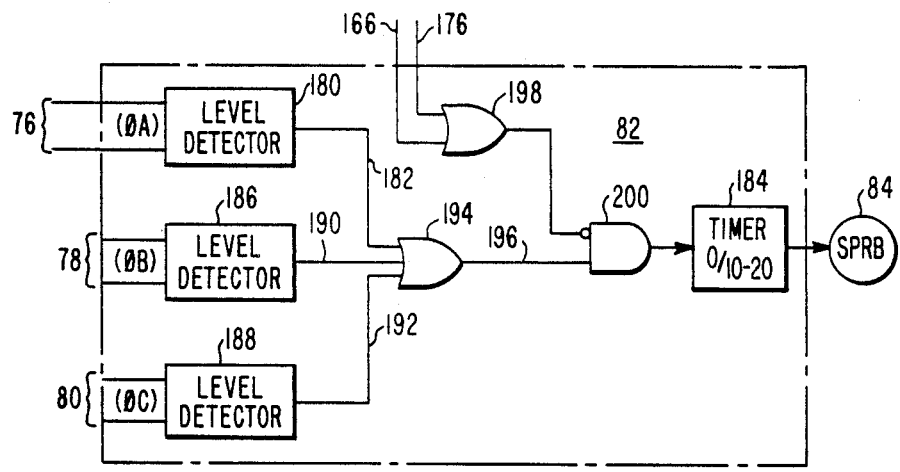
FIG. 8 is a block diagram schematic of a sudden pressure relay supervisory unit suitable for use in the embodiment of FIG. 5.

Referring to FIG. 8, the supervisory unit 82, in accordance with the present embodiment, includes at least one level detector 180 which has its input coupled to the selected restraint signal 76 and may be preset to a predetermined potential level. The level detector 180 is responsive to an event including the occurrence of the selected restraint signal 76 associated with the power system phase A exceeding the predetermined level to generate its output signal 182 in a first state which is utilized to energize the SPRB relay coil 84. The energization of the relay coil 84 opens a normally closed SPRB contact which is coupled in series with the SPR contact to block the SPR fault signal from operating the breakers via energization of the lockout relay LR as shown by the relay logic schematic of FIG. 6. When the selected restraint signal 76 is below the predetermined level of the detector 180, the signal 182 is rendered in a second state to deenergize the SPRB relay coil 84 and relieve the aforementioned blocking condition.

Moreover, the supervisory unit 82 may include a timer 184 for delaying relief from the aforementioned blocking condition for a predetermined time period from the occurrence of an event including the selected restraint signal 76 rendered below the predetermined level of level detector 180. In this manner, the blocking condition is sustained after the fault condition is relieved long enough to allow the SPR to stabilize and deenergize (see the relay logic of FIG. 6).

The supervisory unit 82 may include corresponding level detectors 186 and 188 for the phases B and C of the power system network and transformer 20. The selected restraint signals 78 and 80 correspondingly associated with the phases B and C may be provided to the inputs of their corresponding level detector 186 and 188. In turn, the level detectors 186 and 188 may provide their output signals 190 and 192, respectively, along with the output signal 182 associated with phase A to an OR gate 194. Should any one of the signals 182, 190 or 192 be generated in a first state indicative of an external fault, the OR gate 194 generates responsively its output signal 196 in a first state; otherwise, the output signal 196 is rendered in a second state.

In operation, when the output signal 196 is transferred from the second state to the first state indicative of an external fault condition, the timer 184 passes the signal directly without delay to energize the relay coil 84. Because the detection of the external fault condition is embodied in electronic circuitry as described in connection with the embodiments of FIGS. 5, 7 and 8, hereinabove the speed at which the signal is initiated to energize the relay coil 84 will naturally occur much faster than the electromechanical action of the conventional SPR 50 in response to the rate of change of gas pressure in the sealed enclosure 48. Thus the SPRB normally closed contact will open before the SPR contact can close to block the operation of the SPR from energizing the lockout relay LR, the effect of which ultimately blocking the opening of the breakers 42, 44 and 66, for example.

Conversely, when the external fault condition is relieved, the electronic circuitry reacts just as responsively to cause the corresponding signal 182, 190 or 192 to be transferred from the first state to the second state. When all of the signals 182, 190 and 192 are transferred from the first state to the second state, the OR gate 194 transfers its output signal 196 responsively from the first state to the second state. However, for this transition in signal states, the timer 184 delays deenergization of the relay coil 84 for a predetermined time period. This time period may vary according to the SPR used. The normal range of this time period may be from 10 to 20 seconds to allow sufficient time for the SPR to respond and stabilize upon relief of the external fault condition. Thereafter, the timer 184 deenergizes the relay coil 84 thus closing the contact SPRB which enables the operation of the breakers in response to the SPR fault signal generation.

Another aspect of the present invention relates to the signals 166 and 176 which provide information indicative of an inrush excitation condition and an internal fault condition, respectively. The signals 166 and 176 may be provided to the inputs of an OR gate 198, the output of which being provided to an inverting input of an AND gate 200 for governing the operation of the timer 184. The signal 196 may be coupled to the other input of the AND gate 200. Normally, both signals 166 and 176 are in their second states which permit the OR gate 198 to enable the AND gate 200 to respond to the signal 196 and energize the timer 184. However, when the signal 176 is in the first state indicative of an internal fault condition, the OR gate 198 responsively transfers its output signal to the first state which inhibits the output signal of the AND gate 200 from energizing the timer 184 (i.e., the AND gate 200 is unresponsive to the signal 196). Similarly, when the signal 166 is in the first state, the OR gate 198 transfers its output responsively to the first state to again inhibit the output of the AND gate 200 from energizing the relay timer 184. In this manner, either the detection of an internal fault condition (signal 176) or the detection of an inrush condition (signal 166) may inhibit the blockage of the SPR fault signal from operating the breakers for the duration of either the internal fault or inrush conditions.

While the present invention has been described hereabove in connection with a specific embodiment, it is understood that additions and modifications thereto may be made without deviating from the broad inventive principles. Accordingly, the present invention should not be limited to any one embodiment, but rather construed in scope and breadth according to the recitation of the appended claims.

We claim:

1. Apparatus for the supervision of a sudden pressure relay (SPR) system which protects a power transformer of a power system network of at least one phase, said power transformer including a plurality of windings associated with said power system phase, said power transformer being disposed in a sealed enclosure and susceptible to internal and external faults, said SPR system operative to detect a fault condition of said power transformer and to generate a fault signal indicative thereof, said SPR system including a breaker for each of said transformer windings, said breakers operative conditionally in response to said SPR generated fault signal to isolate said transformer windings from said power system network, said SPR supervisory apparatus comprising:

means for generating a signal for each transformer winding representative of the current thereof;

means for generating restraint signals correspondingly from said generated current representative signals;

means for selecting the generated restraint signal having the greatest amplitude;

means responsive to an event including the occurrence of said selected restraint signal exceeding a predetermined fixed level to block said SPR generated fault signal from operating said breakers, said blocking means being operative to relieve said blocking condition when said selected restraint signal is below said predetermined level; and means for delaying relief from said blocking condition for a predetermined time period from the occurrence of an event including said selected restraint signal rendered below said predetermined level.

2. The SPR supervisory apparatus in accordance with claim 1 wherein each current representative signal generating means includes a current transformer;

wherein each restraint signal generating means includes: a signal transformer having one winding coupled to its corresponding current transformer to effect a first potential representative of the corresponding current representative signal across said one winding and a second winding which, by electromagnetic coupling, incurs a second potential, proportional to said first potential, thereacross; and a diode bridge coupled across said second winding to provide a full-wave rectified second potential signal across output terminals thereof;

wherein the selecting means includes circuit paths coupling like terminal outputs of said diode bridges in parallel, the selected restraint signal being the potential developed across said circuit paths, and wherein the blocking means includes a level detector having as an input the potential developed across said circuit paths which it compares with a preset potential representative of the predetermined level, said level detector generating an output signal in a first state to block the fault signal from operating said breakers when said input potential exceeds said preset potential, and generating the output signal in a second state to relieve said blocking condition when said input potential is below said preset potential.

3. The SPR supervisory apparatus in accordance with claim 2 wherein the delay means is a timer coupled to the output of the level detector and operative to delay the relief of the blocking condition for the predetermined time period as measured from the transition of the generated output signal between the first and second states.

4. The SPR supervisory apparatus in accordance with claim 1 including means for detecting an internal fault condition of said power transformer and for inhibiting the blockage of the SPR generated fault signal from operating the breakers during said detected internal fault condition.

5. The SPR supervisory apparatus in accordance with claim 1 including means for detecting an inrush energization condition of said power transformer and for inhibiting tee blockage of the SPR generated fault signal from operating the breakers during said detected inrush condition.

6. In a power system network of at least one phase including: at least one power transformer disposed in a sealed enclosure and susceptible to internal and external faults, said power transformer including a plurality of windings for said power system phase; means for measuring the current in each winding of said transformer associated with said phase and for generating signals correspondingly representative thereof; a differential protective relay unit for generating a restraint signal from each generated current signal and for selecting the generated restraint signal having the greatest amplitude; a sudden pressure relay (SPR) operative to detect a faulty condition of said transformer and to generate a fault signal indicative thereof; and a breaker for each winding of said transformer associated with said phase, said breakers operative conditionally in response to said SPR generated fault signal to isolate the windings corresponding thereto from said power system network, a sudden pressure relay supervisory unit comprising:

means responsive to an event including the occurrence of said selected restraint signal, associated with said power system phase, exceeding a predetermined level to block said SPR generated fault signal from operating said breakers, said blocking means being operative to relieve said blocking condition when said selected restraint signal is rendered below said predetermined level; and means for delaying relief from said blocking condition for a predetermined time period from the occurrence of an event including said selected restraint signal rendered below said predetermined level.

7. The sudden pressure relay supervisory unit in accordance with claim 6 wherein the differential protective relay unit includes means for detecting an internal fault condition of said power transformer and for generating a signal indicative thereof; and wherein the supervisory unit includes means governed by said generated internal fault condition signal to inhibit the blockage of the SPR generated fault signal from operating the breakers.

8. The sudden pressure relay supervisory unit in accordance with claim 6 wherein the differential protective relay unit includes means for detecting an inrush energization condition of said power transformer and for generating a signal indicative thereof; and wherein the supervisory unit includes means governed by said generated inrush condition signal to inhibit the blockage of the SPR generated fault signal from operating the breakers.

9. In a three-phase power system network including: at least one power transformer disposed in a sealed enclosure and susceptible to internal and external faults, said power transformer including a plurality of windings for each phase of said network; a corresponding plurality of current measuring means for each phase, each for generating a signal representative of the current in its corresponding winding; a differential protective relay unit (DRU) for each phase, each DRU responsive to the generated current representative signals corresponding to the phase associated with said DRU to generate corresponding restraint signals and to select from said generated restraint signals the one with the greatest amplitude; a sudden pressure relay (SPR) operative to detect a faulty condition of said transformer and to generate a fault signal indicative thereof; and breaker means operative conditionally in response to said SPR generated fault signal to isolate the transformer from said power system network, a sudden pressure relay supervisory unit comprising:

first, second and third means corresponding to the three phases of the power system network, each of said first, second and third means being responsive independently to an event including the occurrence of the phase corresponding selected restraint signal exceeding a predetermined level to initiate a phase corresponding blocking condition to block said SPR generated fault signal from operating said breaker means, each of said first, second and third means being operative to relieve solely the blocking condition initiated thereby when the phase corresponding selected restraint signal is rendered below said predetermined level; and means for delaying relief from said blocking condition for a predetermined time period from the occurrence of an event including all of said selected restraint signals rendered below their corresponding predetermined levels.

10. The sudden pressure relay supervisory unit in accordance with claim 9 wherein each DRU includes means for detecting a phase corresponding internal fault condition of said power transformer and for generating a signal indicative thereof; and wherein the supervisory unit includes means governed by the generated phase corresponding internal fault condition signals to inhibit the blockage of the SPR generated fault signal from operating the breaker means.

11. The sudden pressure relay supervisory unit in accordance with claim 9 wherein each DRU includes means for detecting a phase corresponding inrush energization condition of said power transformer and for generating a signal indicative thereof; and wherein the supervisory unit includes means governed by the generated phase corresponding inrush condition signals to inhibit the blockage of the SPR generated fault signal from operating the breaker means.

* * * * *